United States Patent [19]

Ellis

[11] Patent Number: 4,790,558
[45] Date of Patent: Dec. 13, 1988

[54] FRONT MOUNTED BALE CARRIER ASSEMBLY

[76] Inventor: Jerald C. Ellis, R.R. 1, Weldon, Iowa 50264

[21] Appl. No.: 85,753

[22] Filed: Aug. 17, 1987

[51] Int. Cl.[4] .......................... A01D 87/12; B60P 1/64
[52] U.S. Cl. ................................... 280/481; 414/24.5; 414/721; 414/920
[58] Field of Search ................. 172/272; 280/760, 481; 414/24.5, 24.6, 546, 551, 686, 721, 911, 920; 293/117

[56] References Cited

U.S. PATENT DOCUMENTS

| | | | |
|---|---|---|---|
| 3,605,906 | 9/1971 | Coates | 172/272 |
| 3,934,726 | 1/1976 | Martin . | |
| 4,027,773 | 6/1977 | Kenworthy | 414/911 X |
| 4,120,405 | 10/1978 | Jones et al. . | |
| 4,194,863 | 3/1980 | Vansickle et al. | 414/24.5 |
| 4,256,426 | 3/1981 | Buss | 414/24.5 |
| 4,299,522 | 11/1981 | Barton et al. | 414/24.5 |
| 4,318,653 | 3/1982 | Benefield et al. | 414/24.5 |
| 4,413,940 | 11/1983 | Southard et al. | 280/760 X |
| 4,579,497 | 4/1986 | Nine | 293/117 X |
| 4,722,651 | 2/1988 | Antal | 293/117 X |

Primary Examiner—Robert J. Spar
Assistant Examiner—Janice Krizek
Attorney, Agent, or Firm—Henderson & Sturm

[57] ABSTRACT

A bale carrier assembly (10) for use with a tractor (11) having a substantially U-shaped frame (16), the bale carrier assembly (10) comprising: a mounting unit (22) secured to the tractor frame (16); a tine unit (23) pivotally connected to the mounting unit (22) and extending forwardly of the tractor (11) for engaging a bale (14); a thrust device (24) pivotally connected between the mounting unit (22) and the tine unit (23) at a location forwardly of the front end (12) of the tractor (11) for adjustably lifting and lowering the tine unit (23) to engage and disengage the bale (14); and a thrust resisting unit (26) for resisting the thrust upon the mounting unit (22), and connected between the tractor frame (16) and the mounting unit (22).

5 Claims, 2 Drawing Sheets

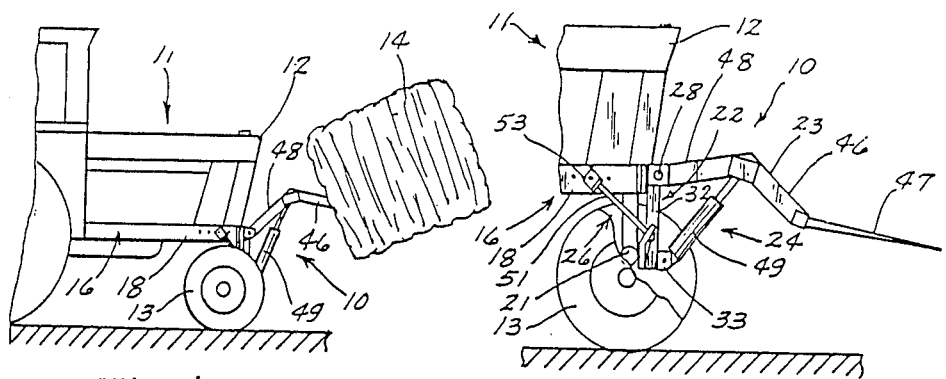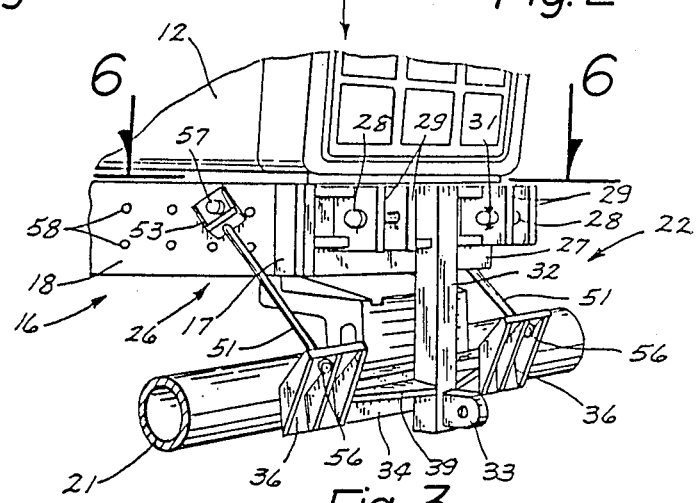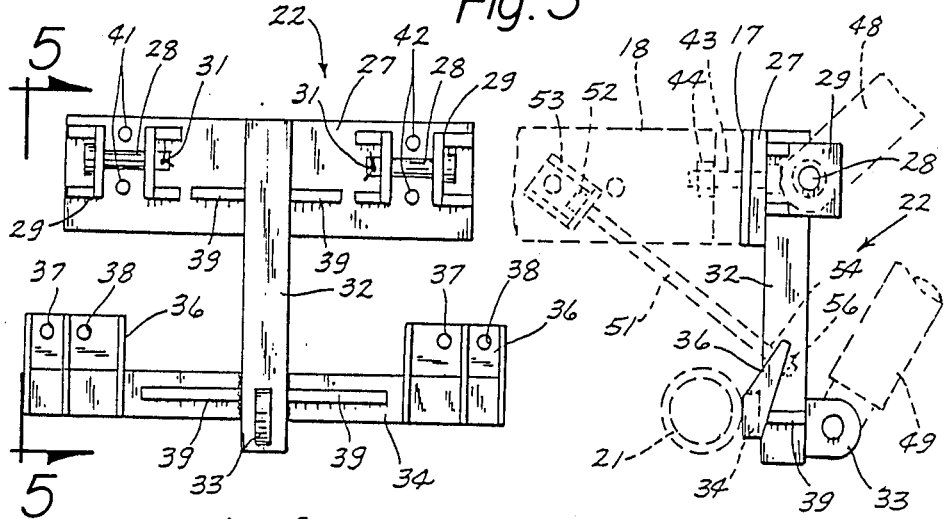

FRONT MOUNTED BALE CARRIER ASSEMBLY

TECHNICAL FIELD

The present invention relates generally to handling and transporting large round bales of hay or the like, and particularly to the handling and transporting of such bales by a vertically movable tine or spear unit mounted on the front end of a tractor.

BACKGROUND ART

To mount a tine unit on the front end of a tractor for the handling and transporting of large round bales of hay or the like is well known. However, most of these structures are large and cumbersome, requiring the use of extra, mechanical equipment for mounting and demounting, and not providing a universal mount. Three such examples are disclosed in U.S. Pat. Nos. 3,934,726; 4,256,426; and 4,299,522.

Those concerned with these and other problems recognize the need for an improved front mounted bale carrier assembly.

DISCLOSURE OF THE INVENTION

The invention relates to a bale carrier assembly for use with a tractor having a substantially U-shaped frame, which frame has a base extended transversely at the front end of the tractor and has rearwardly extended legs, the bale carrier assembly comprising: a mounting unit which is secured to the tractor frame, and which mounting unit has an upper portion and a lower portion, the lower portion being below the tractor frame; a tine unit pivotally connected to the mounting unit and extended forwardly of the tractor for engaging a bale of hay or the like; a thrust unit in the form of a hydraulic piston and cylinder device which is pivotally connected to the lower portion of the mounting unit and to the tine unit at a location forwardly of the tractor front end, the thrust means being adjustable for raising and lowering the tines to engage and disengage the bale to be transported; and a device for resisting the thrust exerted upon the mounting unit by the thrust means in operation, the thrust resisting device connected between the lower portion of the mounting unit and the tractor frame at a position rearwardly of the front end of the tractor.

The main object of the invention is to provide an improved bale carrier assembly.

A further object of the invention is to provide a bale carrier assembly which may be quickly and easily attached by one person to the front end of a conventional tractor.

A further object of this invention is to provide a round bale carrier which may be readily mounted upon new and existing conventional farm tractors, such that the mounting is of a universal nature.

Another object of this invention is to provide a round bale carrier assembly in accordance with the preceding objects and which is of a simple construction, is easy to mount and use so as to provide a device that will be economically feasible, long lasting and relatively trouble free in operation.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a partial side elevational view of a conventional farm tractor to which the bale carrier assembly of this invention is mounted, and showing the transportation of a large round bale;

FIG. 2 is a slightly enlarged view of the structure of FIG. 1, without the bale;

FIG. 3 is a further enlarged, perspective view of the front end of the farm tractor, showing a first embodiment of the invention in mounted condition;

FIG. 4 is a front elevational view of the mounting unit of FIG. 3;

FIG. 5 is a side elevational view as seen along the lines 5—5 in FIG. 4, with certain parts shown in dotted lines for clarity of the invention;

BEST MODE FOR CARRYING OUT THE INVENTION

Figure 6:
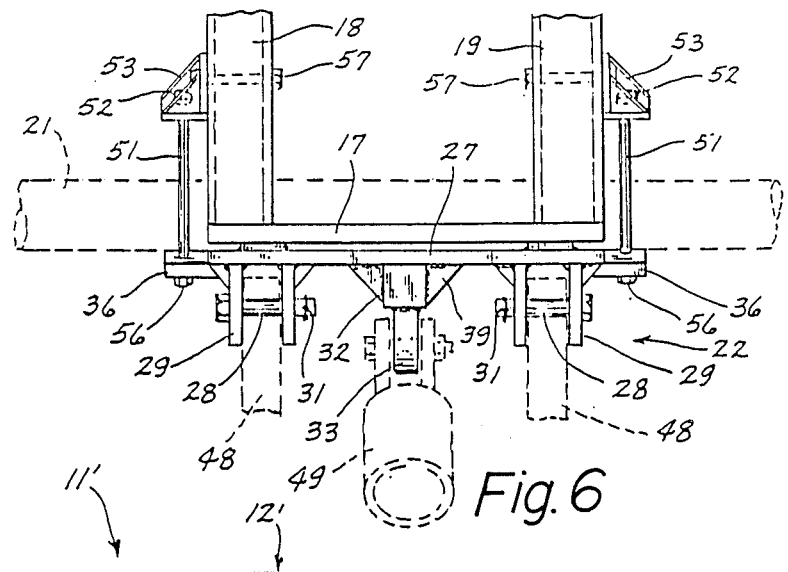
FIG. 6 is a plan view of the structure of FIG. 3.

Referring now more specifically to the illustrations herein, the bale carrier assembly of this invention is indicated generally at (10) and is mounted on a conventional farm tractor (11) at the front end (12) thereof, above a front wheel unit (13), for handling and transporting a large round bale (14) of hay or the like. The tractor has a substantially U-shaped frame (16) at the front end thereof which includes a transverse base (17) and a pair of rearwardly extended, parallel legs (18, 19) (FIG. 6) as elements thereof, disposed above a transverse portion (21) of the front axle.

The bale carrier assembly (10) comprises generally: a mounting unit (22) secured to the tractor frame (16); a tine unit (23) pivotally connected to the mounting unit (22) (FIG. 5) and extended forwardly of the tractor (11) for engaging and holding above the ground the bale (14) until disengagement therefrom; a thrust device (24) pivotally connected between the mounting unit (22) and the tine unit (23) at a location forwardly of the tractor front end (12), the thrust device (24) hydraulically operable off the tractor (11) by conventional controls and lines (not shown) for raising and lowering the tine unit (23); and a thrust resisting unit (26) for resisting the thrust effected upon the mounting unit (22) by operation of the thrust device (24), the thrust resisting unit (26) connected between the tractor frame (16) and the mounting unit (22).

More particularly, the mounting unit (22) has an I-shape in elevation (FIG. 4), and includes an upper portion (27) having a width approximately the same as the width of the frame base (17), with a pair of transversely extended pins (28) mounted thereon in alignment by brackets (29), the pins (28) held in place by cotter pins (31); an upright member (32) with a connecting ear (33) at the lower end thereof; and a lower portion (34) longer than the upper portion (27), an end piece (36) secured at each outer end of the lower portion (34), each end piece (36) having a pair of openings (37, 38) formed therein. Gusset plates (39) are secured across the lower portion (34) for strengthening purposes, and it will be noted that bolt openings (41, 42) are formed in the outer ends of the upper portion (27) behind the pins (28).

The mounting unit (22) is secured, as by bolts (43) (FIG. 5) inserted through the openings (41, 42) and through the frame base (17), connected by nuts (44). In this condition, the upper portion (27) is secured to the base (17), with the upright member (32) and lower portions (34) depending therefrom, spaced slightly forwardly so as not to be in contacting relation with the axle portion (21) (FIG. 5).

The tine unit (23) is an H-shaped frame work comprising elongated, parallel tines (46) pointed at their outer ends (47), the rear ends (48) pivotally connected at the brackets (29) (FIG. 5), and with the tines (46) interconnected by one or more transverse braces (46'). The braces (46') may extend laterally beyond the tines (46), if desirable, to aid in handling the bale (14).

The thrust device (24) comprises a conventional hydraulic piston and cylinder (49) (FIGS. 2 and 7), the cylinder pivotally connected at the mounting unit ear (33), and the rod pivotally connected to one of the braces (46') intermediate the tines (46). Operation of the cylinder (49) effects a pivotal raising and lowering of the tine unit (23) to engage, lift, carry and disengage from the bale (14) as determined by the operator.

Referring to FIG. 3, the thrust resisting unit (26) comprises a pair of rods, either threaded at both ends, or elongated bolts (51), the head end (52) (FIG. 5) connected to a bracket (53) and the threaded end (54) inserted through one of the openings, (37 or 38) (FIG. 4) formed therefor in the end pieces (36), and secured as by a nut (56). The brackets (53) are each secured by one or more cap screws or bolts (57) to a frame leg (18, 19) using one or more of the bolt hole openings (58) provided in the legs (18, 19). In this manner, the thrust of the piston and cylinder (49) on the mounting unit at the lower portion (34) is resisted not only by the structure of the mounting unit (22), but also by the resistance provided by the frame (16) via the rods (51).

Figure 7:
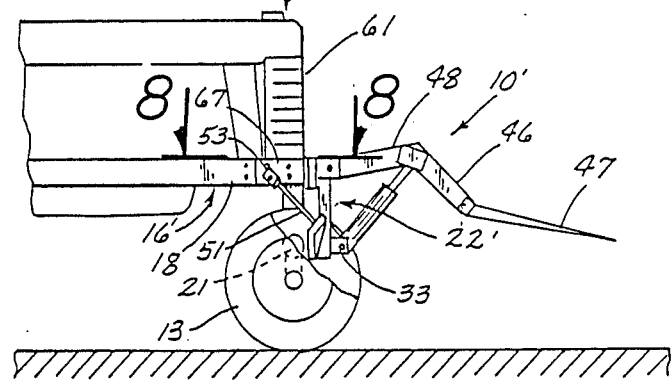
FIG. 7 is a view similar to FIG. 2, and showing a modification of the first embodiment of the mounting of the bale carrier assembly of this invention.
Figure 8:
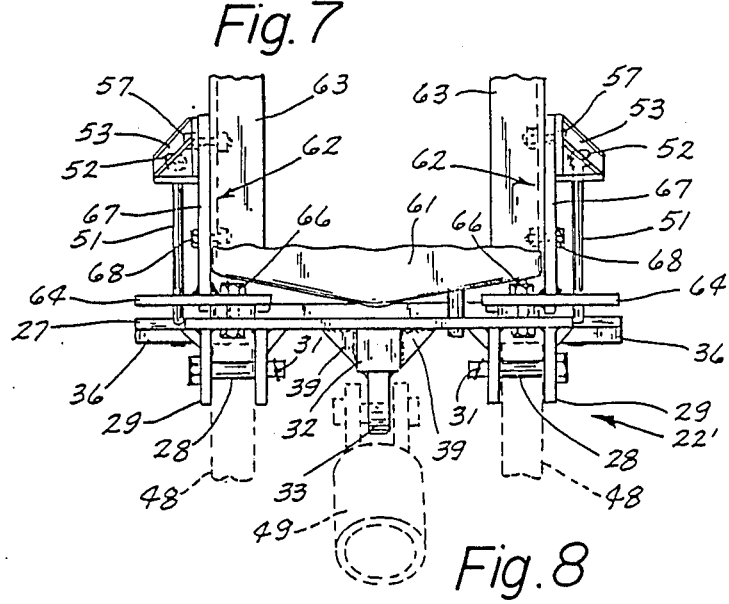
FIG. 8 is a plan view of the embodiment of FIG. 7 as taken along the line 8—8 in FIG. 7.

Referring now to FIGS. 7 and 8, an older tractor (11') is shown, with the bale carrier assembly (10') slightly modified due to the front end (61) (FIG. 8) of the tractor (11') being slightly rounded. Rather than attaching the mounting unit (22') to the rounded front end (61), by the provision of a pair of T-shaped elements (62), the mounting unit (22') is secured to the side legs (62) of the older tractor frame (16'). Each element (62) has a front piece (64) secured as by fastening devices (66) to the mounting unit upper portion (27), using the openings (41, 42) and a rear piece (67) welded to the front piece (64) which rear piece (67) is fastened by fastening devices (68) to the side leg (63). Depending upon the length of the rear pieces (67), the thrust resisting unit brackets (53) are either fastened to the frame side legs (63) directly, or through the rear pieces (67). Otherwise, the assembly (10') and the mounting unit (22') are substantially identical to the embodiment of FIGS. 1-6.

It should be noted that all of the units and elements described hereinbefore as a part of the bale carrier assembly (10) or (10') can normally be assembled by a single person or ordinary strength, such that additional lifting mechanical devices and equipment is not required for the easy and relatively simple assembly and disassembly of the assemblies (10), (10').

I claim:

1. A carrier assembly for use with a tractor having a substantially U-shaped frame, the frame having a base extending transversely across the front end of the tractor and having rearwardly extending legs, the carrier assembly comprising:

a mounting unit adapted to be secured to the tractor and comprising an upper portion having openings formed therein adapted to receive fastening devices for attachment to the tractor frame at the tractor front end, and having further pin means adapted to pivotally receive a pair of arms extending forwardly of the tractor, comprising further an upright member secured centrally of said upper portion and depending therefrom, said upright member having fastening means at a lower end thereof adapted to receive a thrust means extending forwardly of the tractor for attachment to the arms, and comprising further a lower portion connected to said upright member and having outer ends, each of said outer ends having openings formed therein; wherein said lower portion is disposed beneath the substantially U-shaped frame of said tractor;

said mounting unit upper portion, upright member and lower portion disposed generally within a common plane and forming an I-shaped; and, means for resisting a thrust upon said mounting unit, said thrust resisting means adapted to be connected between said lower portion outer ends at the openings therein and the tractor frame at the sides thereof.

2. The carrier assembly of claim 1, and further wherein said mounting unit is adapted to be lifted by an adult for attachment to and detachment from the tractor.

3. The carrier assembly of claim 1, and further wherein said thrust resisting means comprises a pair of rods, each rod connected between a lower portion outer end at the openings therein and the tractor frame at a side thereof.

4. The carrier assembly of claim 1, and further wherein said mounting unit includes a front portion and a pair of side portions, each side portion having a front end secured to said front portion and with the remainder of each said side portion secured to the frame of the tractor at a side thereof and to said thrust resisting means.

5. A carrier assembly including a mounting unit for use with a tractor having a substantially U-shaped frame, the frame having a base extending transversely across the front end of the tractor and having rearwardly extending legs, the mounting unit comprising:

an upper portion having openings formed therein adapted to receive fastening devices for attachment to the tractor frame at the tractor front end and having further pin means adapted to pivotally receive a pair of arms extending forwardly of the tractor;

an upright member secured centrally of said upper portion and depending therefrom, said upright member having fastening means at a lower end thereof adapted to receive a thrust means extending forwardly of the tractor for attachment to the arms;

a lower portion connected to said upright member and having outer ends, each outer end having openings formed therein, said mounting unit upper portion, upright member and lower portion disposed generally within a common plane and forming an I-shape; and thrust resisting means fastened between said lower portion at said outer end openings and the tractor frame.

* * * * *